Nov. 6, 1951 E. W. LEWIS ET AL 2,574,152
ADHESIVE TAPE PACKAGE
Filed Oct. 7, 1947
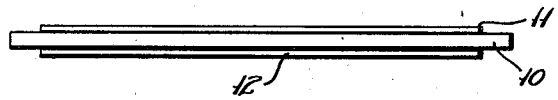
FIG. 1.
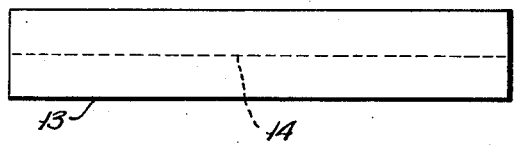
FIG. 2.
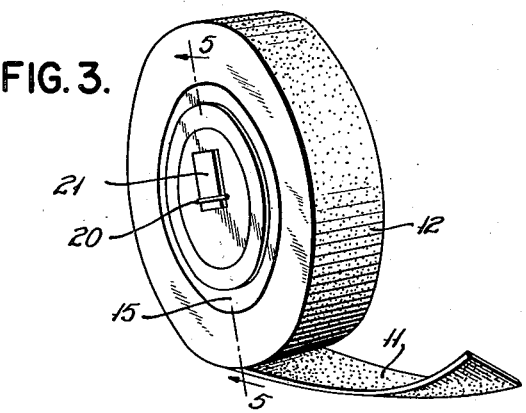
FIG. 3.
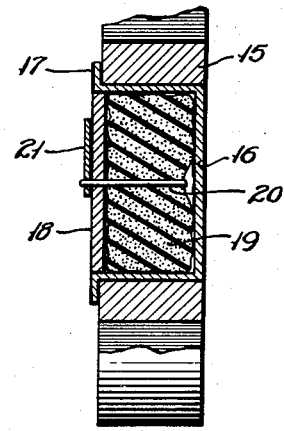
FIG. 4.
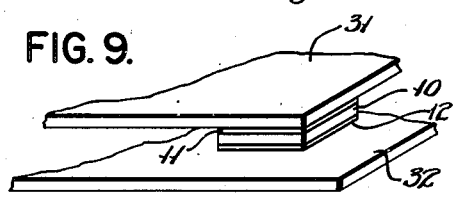
FIG. 9.
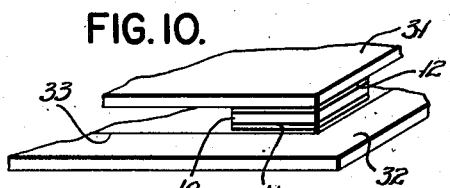
FIG. 10.
FIG. 5. FIG. 6.
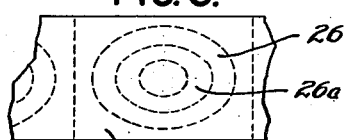
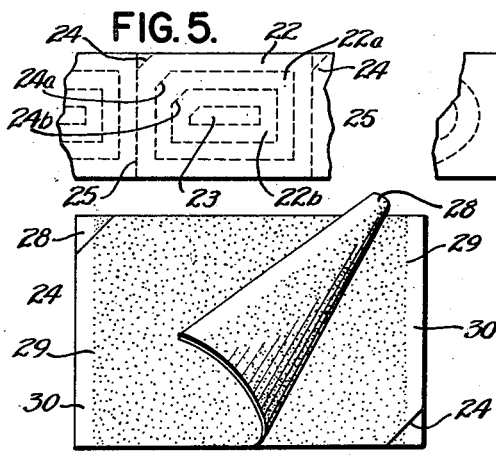
FIG. 8.
FIG. 7.
INVENTORS.
Edwin W. Lewis
Clement H. Watson
BY Blair, Curtis & Hayward
ATTORNEYS.

UNITED STATES PATENT OFFICE 2,574,152

ADHESIVE TAPE PACKAGE

Edwin W. Lewis, Greenwich, Conn., and
Clement H. Watson, New York, N. Y.

Application October 7, 1947, Serial No. 778,488

2 Claims. (Cl. 206—56)

The present invention relates to adhesive coated sheets, or the like, more particularly of the type wherein the sheet or base is provided with a pressure-sensitive adhesive coating on one side and with a coating of a normally non-tacky but soluble adhesive on the other side.

Known forms of adhesive coated sheets or tapes carry pressure-sensitive coatings on both sides, but such sheets cannot be rolled or stacked, or even used unless one of the adhesive surfaces is covered with a layer of Holland cloth, glazed paper, or other specially treated separating sheet, or the like. This extra sheet is expensive and the necessity of stripping it off and disposing of it after the other pressure-sensitive coating surface has been pressed into position is a nuisance. Under many conditions of use, this stripping operation is awkward and difficult and, in attempting it, the tape itself may be stripped off instead of its protective sheet and the base to which it is applied may thus be torn or otherwise injured. Known forms of tapes or sheets provided with hard or non-tacky but soluble coatings on both sides are also difficult to use under some circumstances. In moistening one side of such tapes, for example, the other side also frequently becomes accidentally moistened. Furthermore, if such tapes are rolled without a suitable separating element, the several layers are likely to become cemented together, particularly under humid conditions, into a more or less solid mass.

An object of the present invention is to provide an adhesive sheet, or the like, which utilizes the desirable features of both the pressure-sensitive and the soluble adhesive coatings and minimizes the disadvantages of both. For example, in mounting photographic prints, water colors, drawings, newspaper clippings, engravings, or the like, on a mount or in a book, a pressure-sensitive adhesive has the disadvantage, besides those previously suggested, of gripping immediately and therefore permits no slippage or movement of adjustment of the print to align its edges accurately in relation to the mount. When a soluble adhesive (by which is meant one which is normally non-tacky but is rendered adhesive by moistening) is employed for a similar purpose, the wetting produces an initial lubrication which for a few moments permits slippage between the print and the adhesive sheet and between the latter and the mount. This delays mounting procedure to the extent that the bond between the adhesive strip and the print must be allowed to set before the print is affixed to the mount.

By providing the opposite sides of the mounting strip with the two different kinds of adhesive coating above mentioned, the pressure-sensitive side can be applied to the print first with no slippage and with immediate gripping and then the soluble coating of the other side can be moistened and applied to the mount with such initial slippage thereon as may be needed to properly position the prints before the soluble coating sets.

A further object of the invention has been to provide a sheet, or the like, with adhesive coatings on both sides but of respectively different types which adhere weakly, or not at all, to each other. Thus according to the invention a tape having a rubber type pressure-sensitive adhesive coating on one side and a vegetable gum, particularly gum arabic, dextrin or starch, type of adhesive coating on the other can be readily stripped from the roll or from a pile of separate coated sheets. The rubber base coating in such case is easily releasable from the hard or glossy surface of the soluble coating and serves as a waterproof covering to protect the latter from accidental wetting. Such sheets, if in strip form and rolled, or if arranged in stacks, require no interposed protective layers or separating strips.

A further object of the invention has been to provide pre-formed mounting devices of various sizes and shapes which are convenient for mounting photos, prints, paintings, clippings, displays, etc., and which may conveniently be packaged in stacks, rolls, or other usual or suitable forms.

The invention has the further object of providing an adhesive sheet or tape capable of use as a pressure-sensitive material or as a moistener-sensitive adhesive, and with only one or both side adhesive. This is achieved according to the present invention by use of a sheet or tape coated on one side with a non-tacky moisture-sensitive or heat-sensitive adhesive and on the other with a tacky pressure-sensitive adhesive, said sheet or tape advantageously being scored along its center line to facilitate bending, so that the coating on either side may be brought into exposed position on both sides while the coating on the other side is brought face to face and stuck together between the folded halves, or this can be done by folding the full width of the tape or sheet back upon itself with a transverse fold, in which case scoring is unnecessary. Thus the tape of this invention offers the user a choice between the more permanent or more temporary mounting features characteristic of the two types of adhesives.

A further object of the invention is to provide a choice between a permanent or removable adhesive. If, for example, a photograph or other picture is to be mounted on a temporary mount, the moisture-sensitive adhesive is applied to the picture and the pressure-sensitive to the mount. When desired the picture can then be removed from the mount without damaging the picture, and it can later be mounted on a new mount.

A further object of the invention has been to provide, in combination with a roll of adhesive strip having a non-tacky moisture-sensitive coating, a convenient moistener or applicator readily available for use in moistening the normally non-tacky coating.

Other objects of the present invention and advantages in use will more clearly appear from the following description of a typical embodiment and drawings illustrative thereof. It will be understood that the invention is capable of many different embodiments and that the following description is not intended to be exhaustive or limiting, but on the contrary is designed to instruct others in the principles of the invention and to illustrate and explain it so that they will be enabled to modify and adapt it for various uses and conditions.

In the accompanying drawings:

Figure 1 is an enlarged side view of a fragment of a sheet or tape according to the invention;

Figure 2, a top plan view of a piece of tape having an adhesive coating on one surface which has characteristics different from those of the adhesive coating on the other or opposite surface, and having a scoring extending longitudinally of said tape;

Figure 3, a view in perspective of a rolled length of the tape shown in Figures 1 and 2 carried on a core which houses a moistening element;

Figure 4, a fragmentary view of a portion of the roll shown in Figure 3 in section to show the hollow core and the moistening device carried thereby;

Figures 5 and 6, plan views of fragments of tape showing transverse scorings or cuts and scorings or cuts defining frame-like mounting devices of various shapes and sizes;

Figure 7, a side elevation of a pile or stack of sheets, with thickness exaggerated, and having corner portions modified to facilitate removal of sheets from the stack;

Figure 8, a top plan view of a pile or stack of sheets having cut corners and uncoated edge portions;

Figure 9, a view in perspective with dimensions exaggerated, of a corner portion of a photographic print and a mount with an interposed mounting piece having its pressure-sensitive coating engaging the under surface of the print and its soluble adhesive coating engaging the upper surface of the mount; and Figure 10, a view like Figure 9 but with the coatings of the mounting piece in reversed relation to the print and the mount respectively.

An adhesive sheet or tape for the purposes of the present invention, and as shown in Figure 1, comprises a base or backing 10 of paper, non-fibrous film, or any suitable flexible sheet material. It will be understood, of course, that the thickness dimensions are exaggerated for clearer showing.

A layer of pressure-sensitive adhesive substance, in the form of a coating 11, is provided on one surface of said backing 10. The opposite surface carries a layer of normally non-tacky but soluble adhesive substance in the form of a coating 12.

In Figure 2, the adhesive carrying sheet is shown in the form of a tape 13 having a longitudinally extending scoring 14, or the like, which permits said tape to be readily folded in either direction along its center line to bring one longitudinal edge portion thereof toward the other. With this arrangement, the tape can be used either as a double-faced pressure-sensitive tape or double-faced moisture-sensitive or soluble adhesive tape. If bent one way, both exposed faces of the hinge will present the soluble coating and the pressure-sensitive coating will adhere face to face on the inside of the fold; and if moistened and bent the opposite way, the pressure-sensitive coating only will be exposed, while the gummed faces stick together.

As shown in Figures 3 and 4, an adhesive sheet in tape form and having on one face (inner) the coating 11 and on the opposite face (outer) the coating 12 is wound in a roll on a hollow core 15. This brings the tacky pressure-sensitive coating into close contact with the normally non-tacky but soluble coating 12 throughout the length of the overlapping portions of the rolled strip. Where the tacky coating 11 is of water repellent character and the coating 12 is normally glossy and non-tacky but water soluble, said tacky coating 11 serves to protect the water soluble coating against wetting. By use of a water-repellent pressure-sensitive adhesive such as the ordinary rubber composition used on masking tape and adhesive tape, one gains the advantage that even if said coating 12 on the backing 10 becomes moistened while rolled in contact with the coating 11, no adhesion follows and the layers of the roll may be peeled off for normal use when the tensile strength of the paper is restored by drying.

As shown in Figures 3 and 4, the hollow core 15 may be provided with a receptacle 16 of waxed paper or other suitable material, having a flange 17 closely engaging an outer face portion of core 15. A cap 18 of relatively stiff paper board such as is commonly used in forming milk bottle caps, for example, has an applicator 19 attached to the inner face thereof by a staple 20. The applicator 19 may be of sponge, or other suitable porous or moisture absorbing material by which the coating 12 can be conveniently moistened. A finger tab 21 is secured to the outer face of cap 18 by said staple 20 or other suitable fastener.

Cap 18 will be of a size to fit snugly into the open end of receptacle 16. By turning or bending an end portion of tab 21 outwardly, said tab provides a convenient finger piece by which to lift the cap 18 and the applicator 19 from the open end of receptacle 16.

It is contemplated that sheets coated as above described may be produced and marketed in widely varying sizes and shapes other than the tape in roll form shown in Figure 3.

As seen in Figure 5, a paper sheet coated as described is subjected to the cutting action of appropriate dies, or the like, which form rectangularly shaped frame-like photo mounting pieces 22, 22a, 22b, and a rectangular piece 23. In the same operation, if desired, corner portions, as 24, 24a, 24b, are stamped or cut out. These adhesive mountings may be fully cut out and supplied in stacks, as shown in Figure 7, or may be cut substantially through the paper but left in situ as shown in Figures 5 and 6. The latter can be supplied in stacks or rolls. Transverse scorings or cuts 25 define lines of separation between the pieces 22 of adjacent sections of the coated paper sheet.

In Figure 6, frame-like pieces 26 and 26a of oval shape and a piece 27 having a rectangular outer edge and an oval inner edge are cut from rectangularly shaped paper sheets.

In the stacks shown in Figures 7 and 8, the sheets are arranged with cut-away corners 24 of one sheet opposite a normal corner 28 of the next contiguous sheet or sheets. Also, in Figure 8, the coating 11 of each sheet is shown as ending at line 29, leaving an uncoated or non-adhesive non-tacky surface 30 adjacent an edge portion of each sheet. The sheets are so arranged in the stack that the surfaces 30 of alternate sheets are at opposite ends of the stack. Where the corners 24 are cut, said corners of alternate sheets are arranged at different corners of the stack. The cut-away corners 24 and the non-tacky surfaces 30 provide convenient expedients by which to facilitate the separation of one sheet from another of a stack of sheets.

Figures 9 and 10 illustrate a useful application of embodiments of the invention to the mounting of photographic prints. Thus, as seen in Figure 9, a photographic print 31 is secured to a mount 32 by a sticker piece comprising a paper base or sheet 10, a pressure-sensitive adhesive coating 11, and a soluble normally non-tacky coating 12. Where the sticker pieces are applied first to corner portions of the back of the print 31 with the pressure-sensitive coating engaging the print, said coating grips immediately. This arrangement also provides a relatively impervious layer between the sheet 10 and print 31 so that when moisture is later applied to coating 12 to render it tacky, there is less likelihood that the print will absorb moisture from the sticker piece and curl or be deformed at its corners. A similar advantage resides in use of the frame-shaped sticker pieces, as 22, 22a, 22b, 26, and 26a, Figures 5 and 6.

Where the sticker piece is applied with its pressure-sensitive surface engaging the print, Figure 9, and the coating 12 is moistened by a suitable liquid solvent, coating 12 becomes slippery and so permits adjusting movement of the print 31 in relation to mount 32 for a short time before the adhesive begins to set.

In some cases, it may be satisfactory to use the sticker pieces as shown in Figure 10 with the pressure-sensitive coating 11 in contact with the mount 32 and the soluble adhesive 12 in contact with print 31. This is feasible where the mount has markings, as guide or reference lines 33 or other indicia, whereby the sticker piece may be accurately positioned immediately and without adjusting movement or slippage.

The flexible sheet or base 10 above referred to may be any sheet material capable of tenaciously holding the adhesive coatings among which may be mentioned cloths, felts, papers, laminating sheets of peeled wood, synthetic and natural films, etc. Thus, for example, any of the materials commonly used for gummed tapes, adhesive tapes, etc., may be used. Particularly suitable are: kraft paper, regular sulphate paper, sulfite paper with or without rag stock, etc., which may, with advantage in some cases, be sized and maintained soft by additions of small quantities of glycerine. The paper base is preferably absorbent, unsized and uncalendered; and may advantageously be embossed, crimped or creped, or otherwise formed with rugosities or corrugations to have the appearance of paper towelling.

Such paper or other base sheet may have directly applied to one surface thereof a coating of a soluble adhesive which dries to a non-tacky condition and is rendered adhesive by moistening with the appropriate solvent. This is a process long in common use in manufacture of gummed tapes, and may be practiced in the same way from this invention, provided that the back of the sheet is not treated in any way to prevent anchoring of the pressure-sensitive adhesive thereon. The adhesive coating is advantageously of a character, and so applied and dried, that it will have a high gloss. In any case the dry adhesive coating is of a type such that it adheres more strongly to the base sheet than to the pressure sensitive coating when successive layers are applied one on another.

Some examples of water soluble coatings are:

(1) Tapioca gum of low water solubility (15 to 20% in cold water) and high
gelling strength_____pounds__ 426
Water _____gallons__ 65
Tributyl phosphate_____ounces__ 28

These are mixed cold until smooth and then heated to 190° F., whereupon the following additional ingredients are added:

Pounds
British type tapioca of low gel strength and high water solubility (70 to 80% in cold water) _____ 210
Glucose or urea or both_____ 112

The resulting mixture is cooked with live steam at 190° F. until its volume reaches 162 gallons. The prepared adhesive is then run on the standard gumming machine at a temperature in the neighborhood of 150° F.

The foregoing composition is particularly suitable for a heavy kraft tape, e. g., 60 lb. kraft. For lighter stock as the base sheet the proportion of the British type tapioca can be increased and the low solubility, high gelling strength tapioca correspondingly decreased. This also gives a higher gloss coating.

(2) Gum arabic, 1 part
Starch, 1 part
Sugar, 4 parts
Water, sufficient to give the desired consistency The gum arabic is dissolved in a portion of the water, the sugar is added, then the starch. Thereafter this mixture is boiled for a few minutes to dissolve the starch, after which it is thinned out to the desired consistency by adding water.

Dextrose may be used in place of gum arabic in the same proportion, or other types of vegetable gums. Boric acid may be used as a preservative and for stiffening the mixture as is well understood in the art of gumming. This composition is particularly suitable for the gumming of relatively thin and flexible paper.

(3) Glue, 45 parts
Glycerine, 15 parts
Water, 39 parts

These are prepared by soaking the glue for two hours in cold water, then heating to 140° F. to melt the glue into solution. When uniformly dissolved the glycerine is stirred in and if the solution is to be held for more than a few hours a preservative, e. g., from 0.1% to about 1% may be added. Suitable preservatives are beta naphthal, e. g., in the amount of 0.1% and the various preservatives sold under the trade name "Dowicides" which should be used in accordance with manufacturer's directions.

The other side or surface of the paper has applied thereto a coating of water insoluble, non-drying (i. e. permanently tacky) adhesive, preferably of the water-repellent type. Such compositions are well known and have long been in common use for so-called surgeons' tape, masking tape and various industrial tapes. Examples of such adhesives and their manner of application are described in Reissue #19,128 of U. S. Patent No. 1,760,820 dated May 27, 1930. Such known compositions and methods may be used in the practice of this invention, but special care has to be used to avoid damage to the dried coating first applied.

Thus, if the pressure-sensitive coating is applied hot to an ordinary gummed tape, the rolls in contact with the non-tacky adhesive should be chilled to avoid softening by heat, or the adhesive used for the non-tacky soluble coating should be one which is not softened at the temperatures used for application of the rubber composition. If the pressure-sensitive adhesive is applied in aqueous dispersion or in any other vehicle which would soften the non-tacky coating, the paper or other base should be treated to resist passage of the solvent through it or the sheet should be passed into a drying chamber before its soluble coating becomes tacky and then dried before it is brought into contact with any other surface to which it would be likely to adhere.

It is also possible to make a standard pressure-sensitive tape first (except that the usual treatment of the back to make it repellent to the pressure-sensitive adhesive should be omitted) and the back of the tape then gummed, as in the manufacture of ordinary gummed tape. But in this case all the supporting rolls must be of a type from which the pressure-sensitive adhesive can be readily pulled off and care must be taken to avoid contamination of the face of the adhesive which would reduce its adhesiveness. For supporting rolls one may use in such case clean polished metal, enameled or glass rolls, advantageously kept wet with water, e. g., by spraying or rubbing against a wet felt.

We claim:

1. As a new article of manufacture a package comprised of superimposed laminae each comprising a flexible base having a water repellant pressure sensitive adhesive coating on one side thereof and a normally non-tacky, dry moisture sensitive adhesive coating on the other side, the water repellant coating being coextensive in area and shape with the moisture sensitive coating, said laminae being superimposed with the water repellant adhesive coating of one lamina overlying in registering relationship and peelably bonded to the moisture sensitive adhesive coating of the next adjacent almina to protect the latter against moisture.

2. As a new article of manufacture a roll of tape comprised of a flexible sheet having a water repellant pressure sensitive adhesive coating on one side thereof and a normally non-tacky, dry moisture sensitive adhesive coating on the other side, the width of the water repellant coating being the same as that of the moisture sensitive coating, said sheet being rolled with the water repellant adhesive coating overlying in registering relationship and peelably bonded to the moisture sensitive adhesive coating to protect the latter against moisture.

EDWIN W. LEWIS.
CLEMENT H. WATSON.

REFERENCES CITED

The following references are of record in the file of this patent:

UNITED STATES PATENTS

| Number | Name | Date |
|---|---|---|
| 603,316 | Bush | May 3, 1898 |
| 716,249 | Knowlton et al. | Dec. 16, 1902 |
| 852,397 | Penney | Apr. 30, 1907 |
| 1,214,750 | Burtis | Feb. 6, 1917 |
| 1,582,449 | Bundy | Apr. 27, 1926 |
| 2,030,135 | Carpenter | Feb. 11, 1936 |
| 2,109,583 | Bennett | Mar. 1, 1938 |
| 2,142,194 | Karfiol | Jan. 3, 1939 |
| 2,246,984 | Palmer | June 24, 1941 |